(12) United States Patent
Chen

(10) Patent No.: US 9,520,912 B1
(45) Date of Patent: Dec. 13, 2016

(54) SHOCK ABSORBING PHONE CASE WITH HIDDEN COMPARTMENT

(71) Applicant: Cretronix, Inc., Mission Viejo, CA (US)

(72) Inventor: Brad Yin Chen, Mission Viejo, CA (US)

( * ) Notice: Subject to any disclaimer, the term of this patent is extended or adjusted under 35 U.S.C. 154(b) by 0 days.

(21) Appl. No.: 14/801,729

(22) Filed: Jul. 16, 2015

(51) Int. Cl.
  *H04M 1/00* (2006.01)
  *H04B 1/3888* (2015.01)
  *A45C 11/00* (2006.01)
  *B65D 81/02* (2006.01)

(52) U.S. Cl.
  CPC ............ *H04B 1/3888* (2013.01); *A45C 11/00* (2013.01); *B65D 81/022* (2013.01); *A45C 2011/002* (2013.01)

(58) Field of Classification Search
  USPC ............... 455/575.8; 320/114, 707, 115, 107
  See application file for complete search history.

(56) References Cited

U.S. PATENT DOCUMENTS

| 7,199,554 | B2 * | 4/2007 | Kim ..................... | H04M 1/0208 320/107 |
| 7,375,967 | B2 * | 5/2008 | Huang ................... | G06F 1/1632 165/104.33 |
| 7,782,610 | B2 * | 8/2010 | Diebel .................. | G06F 1/1628 361/679.41 |
| 8,183,825 | B2 * | 5/2012 | Sa ........................ | H02J 7/0044 320/107 |
| 8,390,255 | B1 * | 3/2013 | Fathollahi ............. | H02J 7/0045 206/308.3 |
| 2007/0152633 | A1 * | 7/2007 | Lee ....................... | G06F 1/1632 320/114 |
| 2011/0199041 | A1 * | 8/2011 | Yang ..................... | H01M 10/46 320/101 |
| 2011/0234152 | A1 * | 9/2011 | Frossen ............. | H04M 1/72569 320/107 |

\* cited by examiner

Primary Examiner — David Q Nguyen

(57) ABSTRACT

A shock absorbing phone case with hidden compartment provides an electrically insulated casing for receiving and securely retaining a communication device. The casing comprises a hidden compartment for storing a battery that charges the communication device. The casing further comprises a charging assembly that serves to charge and align the communication device inside the casing. The charging assembly transmits and converts electricity for charging the communication device. An alignment bar aligns the charging assembly and the attached communication device in the casing. Flexible tabs on the mount of the charging assembly, and springs on the sidewalls of the casing, absorb impact forces that are applied on the phone case and the contained communication device. Thus, the phone case provides dual charging means and a shock absorption. This enables the communication device to float in the x, y, and z axes of the casing, while still maintaining stability therein.

20 Claims, 7 Drawing Sheets

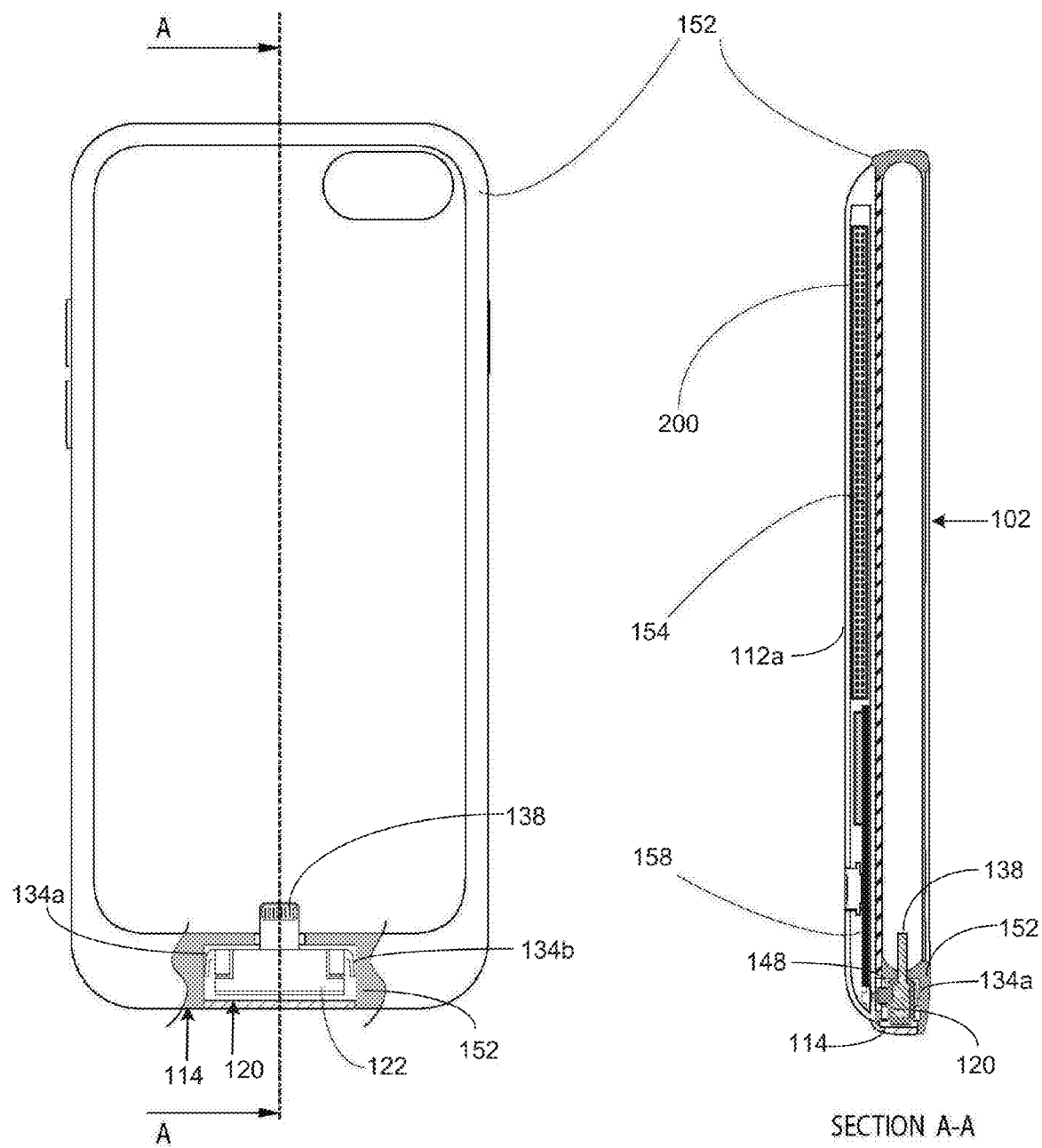
FIG. 2A
SECTION A-A
FIG. 2B
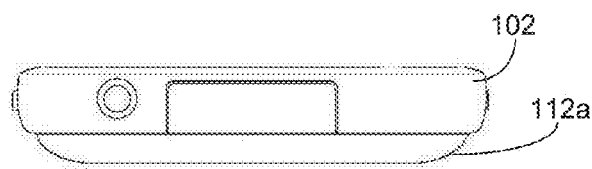
FIG. 2C

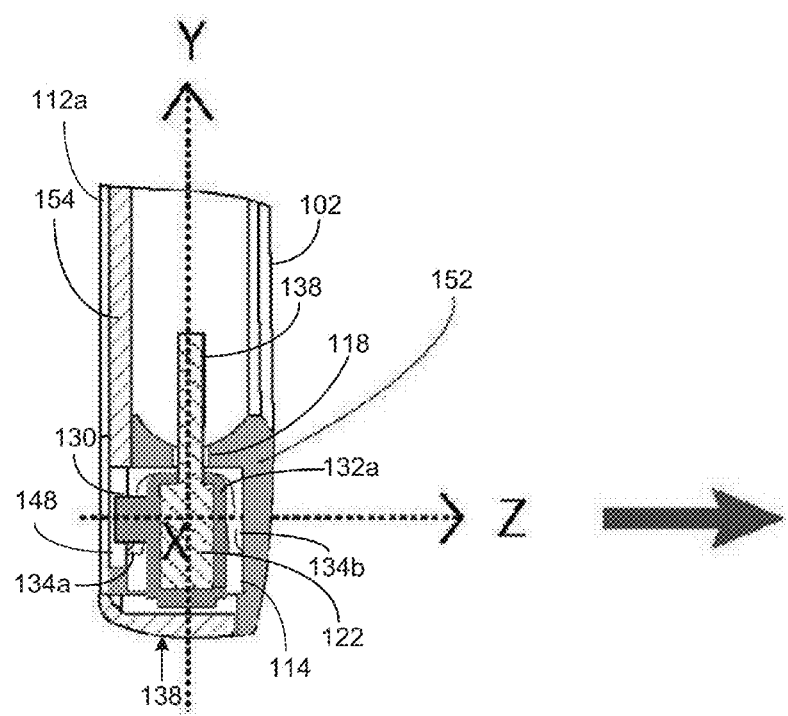 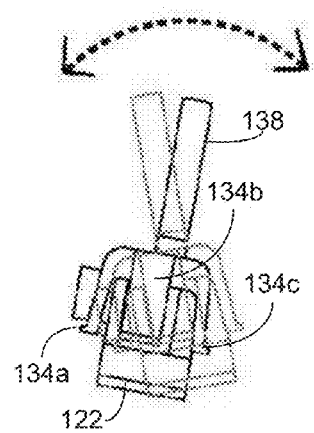
FIG. 7A
FIG. 7B

SHOCK ABSORBING PHONE CASE WITH HIDDEN COMPARTMENT

FIELD OF THE INVENTION

The present invention relates generally to a shock absorbing phone case with hidden compartment. More so, a phone case provides an electrically insulated casing that securely retains a communication device while enabling the communication device to be powered with both a battery that is located in a hidden compartment of the casing, and a charging assembly that operatively converts an AC line voltage into a low DC voltage for charging the communication device, and wherein the charging assembly also serves to stabilize the communication device in the casing by maintaining the communication device in central alignment with the casing, and wherein a pair of mounts on the charging assembly and a plurality of springs mounted on the sidewalls of the casing provide shock absorption to the communication device by flexing when the casing is impacted, and thereby distributing the forces applied to the impacted area.

BACKGROUND OF THE INVENTION

It is known that the communication device is ubiquitous in the modern world to enable interactions and access to work, family, play, and emergency scenarios. Typically, the communication devices audibly announce a call to the user carrying the mobile communication device. Thus, the communication device must be constantly available and functioning to optimize its intent. Consequently, carrying, protecting, and charging mobile communication devices is vital for maintaining the mobile communication device in an operational state. The communication devices include cell phones, and other personal electronic devices such as tablets, MP3 Players, laptops, and personal data assistants PDAs.

In many instances, to maintain the use of a cell phone, the user must periodically charge the cellular battery in the communication device. This is typically performed through the use of an AC charger, wherein one end plugs into an AC wall socket and wherein the other end, separated by a length of wire, plugs into a socket in the communication device. As such, in addition to their communication device, communication device users typically travel with a separate AC charger. Because of the nature of having an additional device to keep up with, many communication device users lose and break the cell phone chargers, which results in the expense of purchasing additional chargers.

It is known that there is a risk of accidental dropping and damage of the communication device. Conventional methods for protecting communication devices include encasing the entire communication device in a hard protective shell case. Hard protective shell cases typically are made of a thermoplastic resin which is molded to house the handheld communication device. Hard shell cases provide excellent protection. However, because of their rigidity, hard shell cases are brittle and subject to shattering when dropped.

Conversely, soft protective shell cases are typically formed from polymeric material, fabric or leather, and are configured to house the mobile communication device. Soft protective shell cases provide marginal exterior protection but are soft to the touch. However, soft protective shell cases are prone to tearing and deformation.

It is recognized that, additional types of protective cases for the communication device are made of plastic, metal, leather or transparent acrylic. While conventional cases provide protection, they suffer from certain inherent shortcomings. The plastic and leather protective cases are too soft to protect the mobile device from impact. The metal and the acrylic protective cases are made of rigid material which can scratch the surface of the mobile device and are difficult to assemble to, or remove from, the mobile device.

Other proposals have involved phone cases that charged a phone or absorbed forceful impacts on the communication device or casing from drops and the like. The problem with these phone cases is that they do not provide dual charging means and a shock absorption means that enable the communication device to float in the x, y, and z axes of the casing, while still maintaining stability therein.

Thus, an unaddressed need exists in the industry to address the aforementioned deficiencies and inadequacies. Even though the above cited methods for phone cases meet some of the needs of the market, a shock absorbing phone case with hidden compartment for retaining a battery and an electrically insulated casing for receiving, aligning, and absorbing impacts imparted on a communication device is still desired.

SUMMARY OF THE INVENTION

The present invention is directed to a phone case that provides an electrically insulated casing for receiving and securely retaining a communication device. The protective material composition and fit provided by the casing helps preserve the structural integrity of the communication device, even when an impact force is applied thereon. The casing encloses the communication device, such that the communication device has free play, or "floats" in the x, y, and z axes of the casing.

The phone case comprises at least one hidden compartment for storing a battery to charge the communication device. The hidden compartment may also be configured to operatively carry a glucose meter. The phone case further comprises a charging assembly that serves to charge and align the communication device inside the casing. Additional energy attenuating components in the casing help absorb and distribute impact forces that are applied on the phone case and the contained communication device.

The casing is uniquely configured to charge the communication device through two different power sources. The first charging feature comprises a hidden compartment that forms along a panel of the casing. The hidden compartment is configured to contain a battery that operatively connects to the communication device for powering thereof.

The casing also charges the communication device through a charging assembly. The charging assembly provides an electrically conductive junction for connecting an AC line to the communication device. This is possible because the charging assembly operatively converts an AC line voltage into a low DC voltage for charging the communication device from inside the casing.

The charging assembly passes through an aperture that forms in at least one casing sidewall and connects to the communication device in the cavity of the casing. The charging assembly rests inside a charge chamber that forms at the casing sidewall. The charging assembly is stabilized and aligned inside the charge chamber, such that transmission of electricity is efficient.

The charging assembly comprises an alignment bar that protrudes from the charging assembly and engages the slot that forms in the chamber sidewall of the charge chamber. The alignment bar forms a generally snug fit in the slot. The snug fit aligns the charging assembly in the charge chamber, wherein the slot restricts pivotal movement by the charging assembly and the attached communication device.

Consequently, the snug fit that is formed between the charging assembly and the slot enables the charging assembly, and thereby the attached communication device, to maintain a central alignment relative to the casing. However, despite the snug arrangement, the free movement of the communication device in the x, y, and z axes of the casing is still allowed.

In addition to performing the function of charging and aligning the communication device, the charging assembly serves to provide shock absorption for the attached communication device inside the casing. The first feature that enables shock absorption for the communication device inside the casing includes a pair of mounts. The mounts serve to detachably attach the charging assembly inside the charge chamber of the casing.

In some embodiments, the mounts may include a pair of flexible tabs configured to deform during an impact in order to provide energy attenuation for the communication device. The flexible tabs also enable the charging assembly to move laterally against multiple chamber sidewalls that make up the charge chamber. In this manner, the communication device, which is connected to the charging assembly, may move laterally inside the casing.

The second feature that enables shock absorption for the communication device inside the casing includes a plurality of springs. The springs are positioned on the at least one chamber sidewall of the charge chamber. The charge chamber is shaped to include a space between the charging assembly and the chamber sidewall. The space enables the springs to form a flexible, shock absorbing surface inside the chamber sidewalls, such that the charging assembly has freedom to press against the chamber sidewalls. The springs are configured to absorb shocks that are applied to the casing by flexing when the casing is impacted, and thereby distributing the forces applied to the charging assembly and the communication device inside the casing.

Both the flexible tabs of the mounts, and the springs on the chamber sidewalls work in conjunction to create a free floating effect for the charging assembly, and thereby the attached communication device inside the casing. In this manner, the communication device has enough movement and free play to float along the x, y, and z axes of the casing, while still maintaining stability. Additionally, the flexible tabs and springs absorb a substantial portion of the impact forces, such that energy attenuation and uniform impact distribution on the charging assembly results in shock absorption for the attached communication device.

One aspect of a case for providing multiple power sources and absorbing shock for a communication device, comprises:

- a casing, the casing defined by a panel, at least one casing sidewall, and a cavity, the panel formed at a back side of the casing, the at least one casing sidewall having an aperture;
- at least one hidden compartment, the at least one hidden compartment formed at the panel of the casing, the at least one hidden compartment operatively connected to the cavity of the casing;
- a charge chamber, the charge chamber formed at the at least one casing sidewall, the charge chamber defined by at least one chamber sidewall and a slot, and a slot that forms in the at least one chamber sidewall;
- a charging assembly, the charging assembly defined by a housing, a pair of mounts, and a connector, the charging assembly configured to be electrically conductive, the charging assembly disposed to pass through the aperture of the casing, the charge chamber, the slot of the charge chamber, and the cavity of the casing,
- the housing of the charging assembly having an alignment bar arranged in a protruding configuration on the housing, the alignment bar configured to form a snug fit in the slot of the charge chamber, wherein the snug interaction restricts pivotal movement of the charging assembly in the charge chamber,
- the pair of mounts of the charging assembly configured to detachably attach the charging assembly inside the charge chamber, the pair of mounts having a pair of flexible tabs, the pair of flexible tabs configured to deform during an impact in order to create energy attenuation,
- the connector of the charging assembly configured to carry electricity from outside the casing to the cavity of the casing;
- a plurality of springs, the plurality of springs disposed to position on the at least one chamber sidewall, the plurality of springs configured to absorb shocks that are applied to the casing by flexing when the casing is impacted, wherein the forces applied to the charge chamber and the casing are at least partially distributed; and
- a flexible material, the flexible material disposed to line the at least one chamber sidewall and the at least one casing sidewall, the flexible material configured to help absorb impact forces applied to the charging assembly.

In one aspect of the present invention, the phone case is configured to receive a communication device.

In another aspect, the communication device is a smart phone.

In yet another aspect, the casing is fabricated from a synthetic resin cases produced by injection-molding in a specific shape that conforms to the outline of the smart phone.

In yet another aspect, the casing is configured to provide insulation from electricity.

In yet another aspect, the casing is defined by an x, y, and z axes.

In yet another aspect, the casing enables the communication device to move in the x, y, and z axes, so as to create a floating effect.

In yet another aspect, the hidden compartment is sized and dimensioned to store a rechargeable battery.

In yet another aspect, the hidden compartment operatively carries a glucose meter.

In yet another aspect, the rechargeable battery operatively connects to the communication device through a prong.

In yet another aspect, the slot that forms in the chamber sidewall of the charge chamber is generally oval-shaped.

In yet another aspect, the charging assembly forms a conductive junction between an A/C power cable and the communication device.

In yet another aspect, the connector of the charging assembly includes at least one member selected from the following: a USB, a mini USB, and a Micro USB.

In yet another aspect, the housing of the charging assembly forms a generally T-shape.

In yet another aspect, the housing of the charging assembly is defined by an interior end proximal to the communication device, and an exterior end that extends from the aperture of the casing.

In yet another aspect, the interior end of the housing comprises a pair of pins.

In yet another aspect, the pair of mounts comprises a pair of pin holes, wherein the pair of pin holes receive the pair of pins for coupling the pair of mounts to the housing.

In yet another aspect, a material composition of the pair of flexible tabs includes at least one member selected from the group consisting of: rubber, plastic, and metal.

In yet another aspect, the plurality of springs includes six springs positioned equidistant on three chamber sidewalls.

In yet another aspect, the casing further includes a flexible material that is disposed to line the charge chamber, wherein the flexible material is configured to help absorb shock applied to the charging assembly.

In yet another aspect, the casing further includes a magnetic strip that is disposed to line the at least one casing sidewall.

In yet another aspect, the casing further includes a glucose meter that is disposed to extend from the hidden compartment.

In yet another aspect, the flexible material is an elastomer.

One objective of the present invention is to provide an electrically insulated casing that conforms in shape to securely hold the communication device.

Another objective is to provide a hidden compartment that conceals the battery, stores items, and operatively carries a glucose meter.

Another objective is to provide a battery that is rechargeable and fits in the hidden compartment.

Another objective is to provide a secondary means for charging the communication device with the charging assembly.

Another objective is to provide a casing that enables the communication device to float in an x, y, and z axes, so as to protect the communication device from shock, such as forceful impacts from dropping.

Another objective is to provide a pair of flexible tabs on the mounts that are configured to deform during an impact in order to create energy attenuation.

Yet another objective is to provide a plurality of springs in the charge chamber that are configured to absorb shocks applied to the casing by flexing when the casing is impacted.

Yet another objective is to provide an alignment bar that forms a snug engagement with the slot that forms between the charge chamber and the cavity on the casing.

Yet another objective is to provide cost effective phone case that enables facilitated charging of the communication device and shock protection from impacts.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIGS. 2A, 2B, and 2C illustrate sectioned views of the phone case, where FIG. 2A is a front sectioned view, FIG. 2B is a sectioned side view of the casing, the section taken along section A-A of FIG. 2A, detailing an exemplary charging assembly in a charge chamber, and FIG. 2C illustrates a bottom view, in accordance with an embodiment of the present invention;

FIG. 5A is a top angle perspective view, FIG. 5B is a top view facing the connector, FIG. 5C is an elevated side view, and FIG. 5D is a front view, in accordance with an embodiment of the present invention;

FIG. 6A is a sectioned view, and FIG. 6B is a front view of the charging assembly tilting along a Z-axis, in accordance with an embodiment of the present invention; and FIGS. 7A and 7B illustrate side views of the charging assembly in the charge chamber, where FIG. 7A is a sectioned side view of the casing and hidden compartment, and FIG. 7B is a side view of the charging assembly tilting along an X-axis, in accordance with an embodiment of the present invention.

Like reference numerals refer to like parts throughout the various views of the drawings.

DETAILED DESCRIPTION OF THE INVENTION

Figure 1:
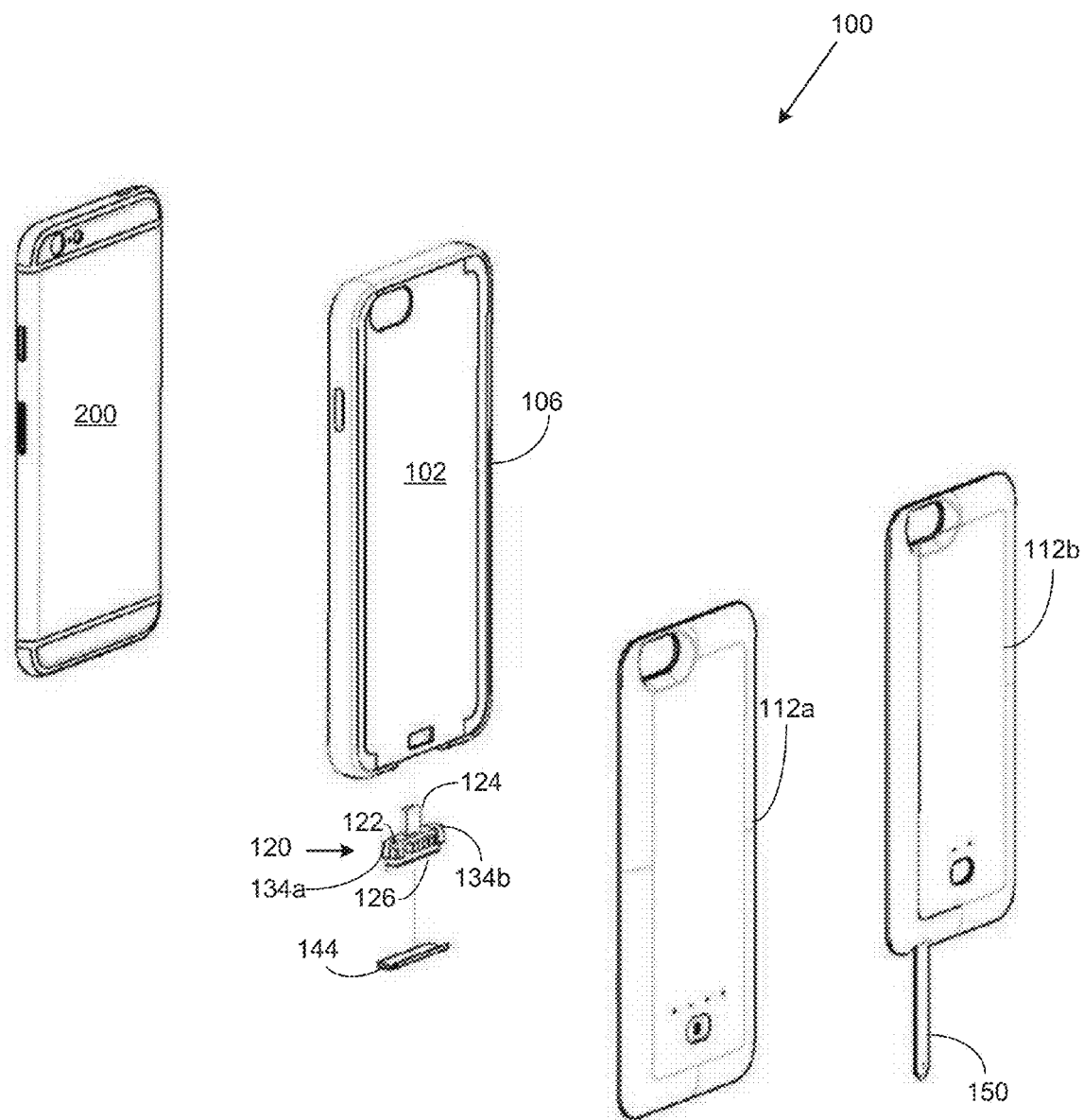
FIG. 1 illustrates a exploded view of an exemplary phone case, showing an exemplary casing, an exemplary hidden compartment carrying a battery, and an exemplary hidden compartment operatively carrying a glucose meter, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention presented in FIGS. 1-7B, a shock absorbing phone case 100 with hidden compartment 112a provides an electrically insulated casing 102 for receiving and securely retaining a communication device 200. The phone case 100 comprises at least one hidden compartment 112a for storing a battery 154 that serves to charge and power the communication device 200. The phone case 100 further comprises a charging assembly 120 that serves to charge and align the communication device 200 inside the casing 102.

Additionally, energy attenuating components in the casing 102 help absorb and distribute impact forces that are applied on the phone case 100 and the contained communication device 200. Thus, the phone case 100 provides a dual charging capacity and shock absorption components that distribute impact forces and attenuate energy applied to the casing 102. This enables the communication device 200 to float in the x, y, and z axes of the casing 102, while still maintaining stability therein.

In one possible embodiment illustrated in FIG. 1, the phone case 100, hereafter, "case 100", may include a casing 102 for receiving and protecting the communication device 200. The protective material composition and fit of the casing 102 helps preserve the structural integrity of the communication device 200, even when an impact force is applied thereon. The casing 102 encloses the communication device 200, such that the communication device 200 has free play, or "floats" in the x, y, and z axes of the casing 102.

Turning now to FIG. 2A, a front sectioned view of a communication device 200 is illustrated. The communication device 200 may include, without limitation, a smart phone, a tablet, a laptop, and a computer. The communication device 200 is encased inside the casing 102 for shock absorption and general protection. The casing 102 is defined by a panel 104, at least one casing sidewall 106, and a cavity 110. The panel 104 forms at a back side of the casing 102. The cavity 110 is sized and dimensioned to receive the communication device 200. For example, the casing 102 may be pried from at least one casing sidewall 106 to fit around the communication device 200. Though, in other embodiments, the casing 102 forms a snap-fit mating configuration with the communication device 200.

FIG. 2B is a sectioned side view of the casing, the section taken along section A-A of FIG. 2A, detailing an exemplary charging assembly in a charge chamber, and FIG. 2C illustrates a bottom view of the hidden compartment 112a. As shown in FIG. 2B, the at least one casing sidewall 106 forms at a periphery of the panel 104. The casing sidewall 106 comprises an aperture 108 that enables passage of electricity and signals from outside the casing 102 to the cavity 110 of the casing 102, where the communication device 200 resides. In one embodiment, an inner surface of the casing sidewall 106 includes a magnetic strip 156 embedded therein. The magnetic strip 156 applies a small magnetic force on the contained communication device 200, thereby creating a floating effect on the generally metallic communication device 200.

Suitable materials for the casing 102 may include, without limitation, a rigid polymer, rubber, silicone, and aluminum. Though in other embodiments, the casing 102 may include soft silicone parts selectively and integrally formed on predetermined portions of inner and outer faces of the casing 102. The soft silicone parts align with various buttons and speakers in the communication device 200. The soft silicone parts may be constructed through double injection molding, and consist of various color combinations and/or at least one shape, pattern, and letter.

The casing 102 is uniquely configured to charge the communication device 200 through two different power sources. The first charging feature comprises at least one hidden compartment 112a that forms along a panel 104 of the casing 102 (FIG. 2C). The hidden compartment 112a is configured to contain a battery 154 that operatively connects to the communication device 200 for powering thereof. The hidden compartment 112a may also store items. An alternative embodiment of a hidden compartment 112b, a glucose meter 150 extends therefrom for approximating glucose levels in the blood.

In some embodiments, the hidden compartment 112a detachably attaches from the panel 104 of the casing 102. The hidden compartment 112a provides a discrete area where a battery 154 may be stored for charging the communication device 200. The hidden compartment 112a may be accessed by sliding a door, detaching the door, or hingedly pivoting the door away from the panel 104. However, in other embodiments, the hidden compartment 112a detaches from the casing 102, forming a separate component therefrom.

From inside the hidden compartment 112a, the battery 154 operatively connects to the cavity 110 of the casing 102 through a prong 160. The battery 154 may include, without limitation, lead-acid, nickel cadmium (NiCd), nickel metal hydride (NiMH), lithium ion (Li-ion), lithium ion polymer (Li-ion polymer), and a rechargeable battery 154. Though, in other embodiments, the hidden compartment 112a may form a storage that is used to store any number of items, including, without limitation, payment cards, business cards, USBs, keys, and pills. However, as discussed above, in other embodiments, a glucose version of the hidden compartment 112b operatively carries a glucose meter 150 for determining the approximate amount of glucose in the blood. In this embodiment of the hidden compartment 112a, a digital display screen may also be used to display glucose content readings. A PCB module 158 may be used to analyze the glucose readings.

Figure 3:
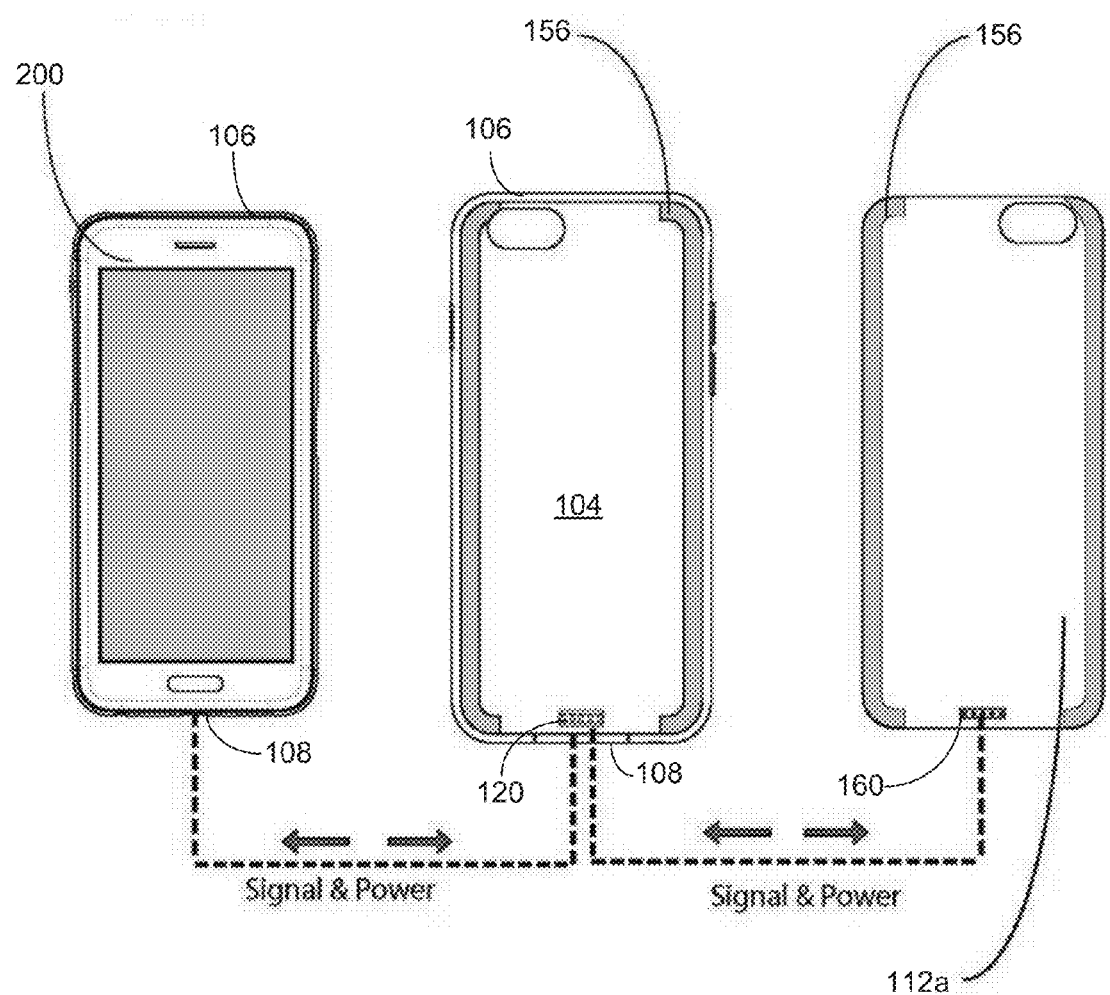
FIG. 3 illustrates the phone case transmitting a signal and electricity through an aperture in the casing to an exemplary communication device, in accordance with an embodiment of the present invention.

In some embodiments, a charge chamber 114 forms at the at least one casing sidewall 106; for example, at a bottom casing sidewall 106. As illustrated in FIG. 3, the charge chamber 114 is configured to enable passage of electricity from outside the casing 102 to the communication device 200 inside the cavity 110 of the casing 102 through a conductor. For example, electricity from and transmission signals pass through an aperture 108 in the casing 102 to access the communication device 200.

The charge chamber 114 is defined by at least one chamber sidewall 116 and a slot 118 that forms in the chamber sidewall 116. The slot 118 forms adjacent to the cavity 110 of the casing 102, so as to enable communication between the charge chamber 114 and the cavity 110 of the casing 102. Thus, the aperture 108 of the casing 102 provides an opening between the exterior of the casing 102 and the charge chamber 114; and the slot 118 provides an opening between the charge chamber 114 and the cavity 110 of the casing 102. In one alternative embodiment, a flexible material 152 lines an inner surface of the chamber sidewall 116 and/or the casing sidewall 106, so as to provide greater shock absorbing capacity. The flexible material 152 may include, without limitation, an elastomer, a rubber, and putty.

Figure 4:
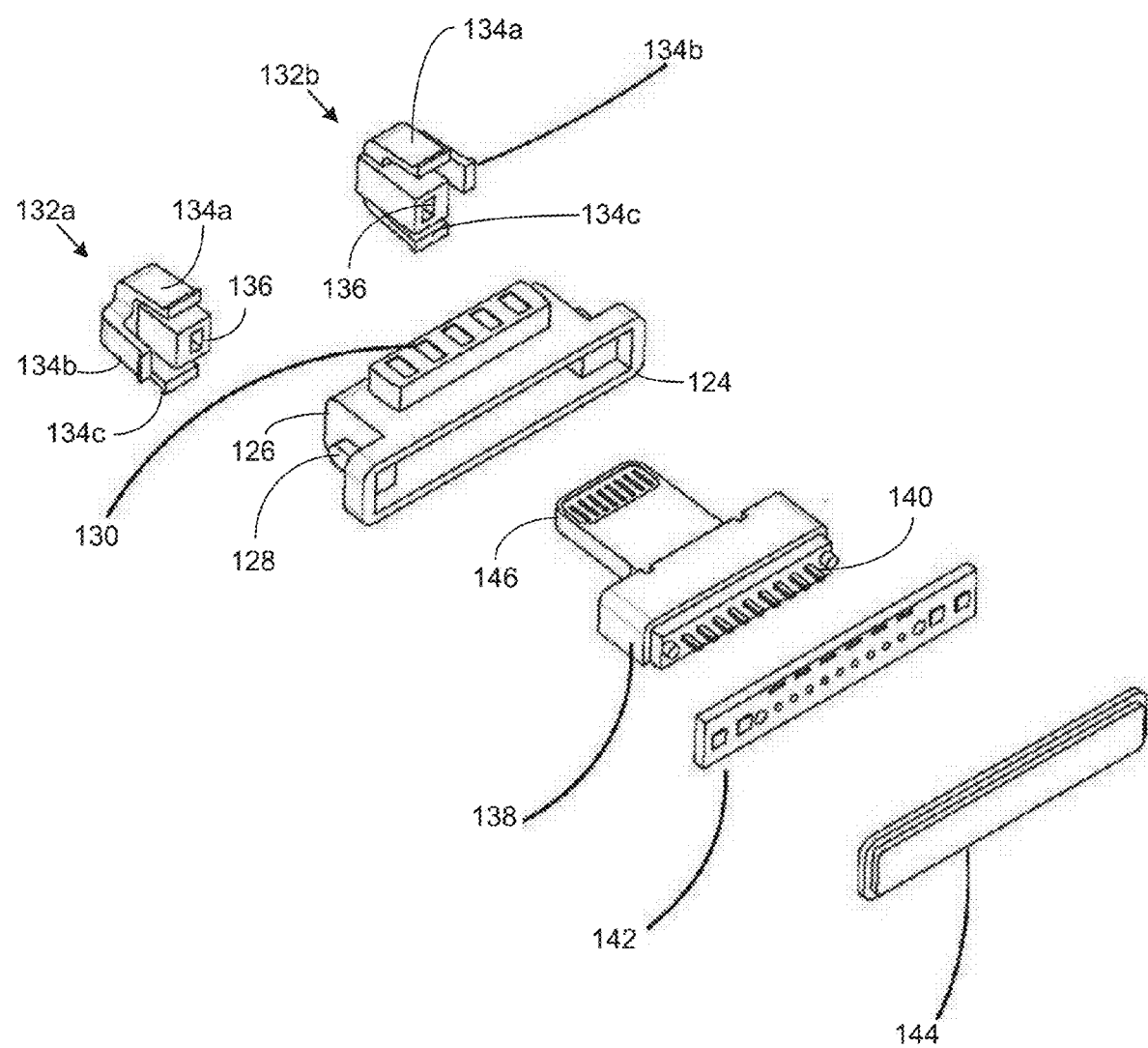
FIG. 4 illustrates a blow up view of the charging assembly, in accordance with an embodiment of the present invention.

Turning now to FIG. 4, the electricity conducting member that passes through the charge chamber 114 for transmitting electricity and signals, is a charging assembly 120. The charging assembly 120 is defined by a housing 122, a pair of mounts 132a-b, and a connector 138. The housing 122 of the charging assembly 120 is defined by an interior end 124 proximal to the communication device 200, and an exterior end 126 that extends from the aperture 108 of the casing 102.

The pair of mounts 132a-b detachably attach to the housing 122 through a pin and pin hole mating configuration. For example, the interior end 124 of the housing 122 comprises a pair of pins 128. The pair of mounts 132a-b comprises a pair of pin holes 136. The pair of pin holes 136 receive the pair of pins 128 for coupling the pair of mounts 132a-b to the housing 122. The connector 138 of the charging assembly 120 passes through the housing 122 to transmit and convert electricity and signals for the communication device 200.

Figure 5A:
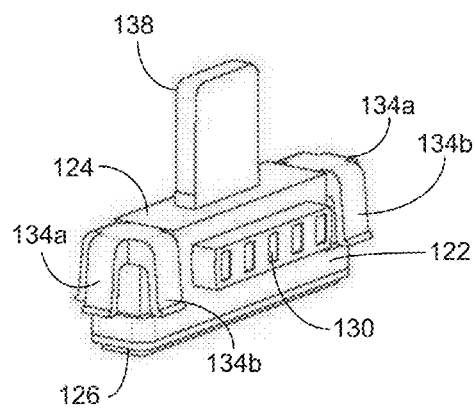
FIGS. 5A, 5B, 5C, and 5D illustrates various views of the charging assembly, where

As discussed above, the charging assembly 120 provides an electrically conductive junction for connecting an AC line to the communication device 200. This is possible because the charging assembly 120 operatively converts an AC line voltage into a low DC voltage for charging the communication device 200 from inside the casing 102. For example, the charging assembly 120 operatively connects to an AC charger, wherein one end of the AC charger plugs into an AC wall socket and wherein the other end, separated by a length of wire, plugs into the charging assembly 120, which itself plugs into the communication device 200. As a result, the communication device 200 may be charged by the battery 154 in the hidden compartment 112a, or the external power source that transmits electricity through the charging assembly 120 (FIGS. 3 and 5A).

Figure 5B:
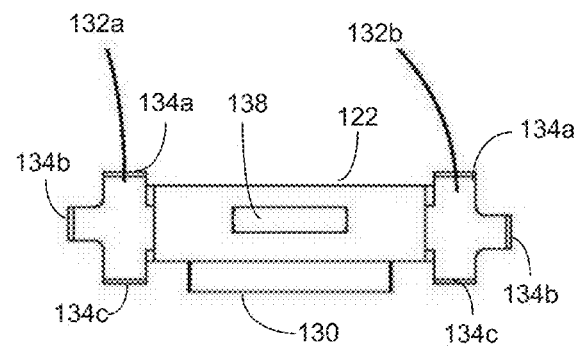

As discussed above, the charging assembly 120 passes through an aperture 108 that forms in the casing sidewall 106 and connects to the communication device 200 in the cavity 110 of the casing 102. The charging assembly 120 rests inside the charge chamber 114 that forms at the casing sidewall 106. As shown in FIG. 5B, the charging assembly 120 is stabilized and aligned inside the charge chamber 114, such that electricity is efficiently transmitted into the communication device 200 for charging. Further, the flexible material 152 that lines the chamber sidewall 116 helps cushion the charging assembly 120 against impact forces.

Figure 5C:
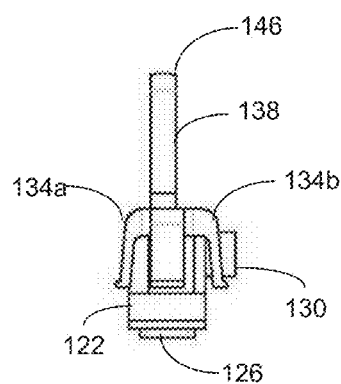

Looking now at FIG. 5C, the charging assembly 120 is configured to be electrically conductive so as to carry electricity and convert AC electrical current to DC electrical current. The charging assembly 120 is disposed to pass through the aperture 108 of the casing 102 for carrying the electricity through the aperture 108 in the bottom casing sidewall 106, the charge chamber 114, the slot 118 at the top chamber sidewall 116, and finally into the cavity 110 of the casing 102 for charging the communication device 200.

Figure 5D:
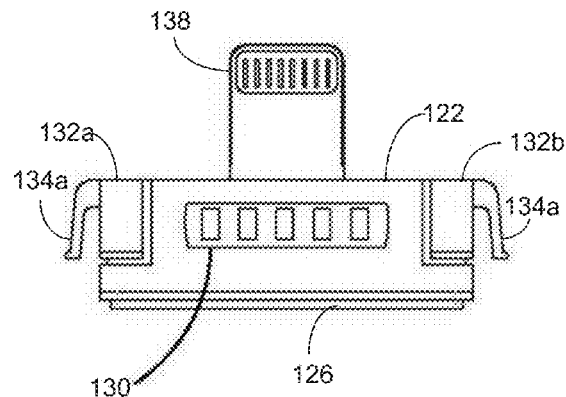

As shown in FIGS. 5B and 5D, the charging assembly 120 comprises an alignment bar 130 that protrudes from the charging assembly 120 and engages the slot 118 that forms in the chamber sidewall 116 of the charge chamber 114. The alignment bar 130 forms a generally snug fit in the slot 118. The snug fit aligns the charging assembly 120 in the charge chamber 114, wherein the slot 118 restricts pivotal movement by the charging assembly 120 and the attached communication device 200. In one embodiment, the alignment bar 130 is generally rectangular and has multiple protrusions that create a detent against the slot 118.

Consequently, the snug fit that is formed between the charging assembly 120 and the slot 118 enables the charging assembly 120, and thereby the attached communication device 200, to maintain a central alignment relative to the casing 102. However, despite the snug arrangement, the free movement of the communication device 200 in the x, y, and z axes of the casing 102 is still allowed, so as to more efficiently absorb the impact forces.

Figures 6A, 6B:
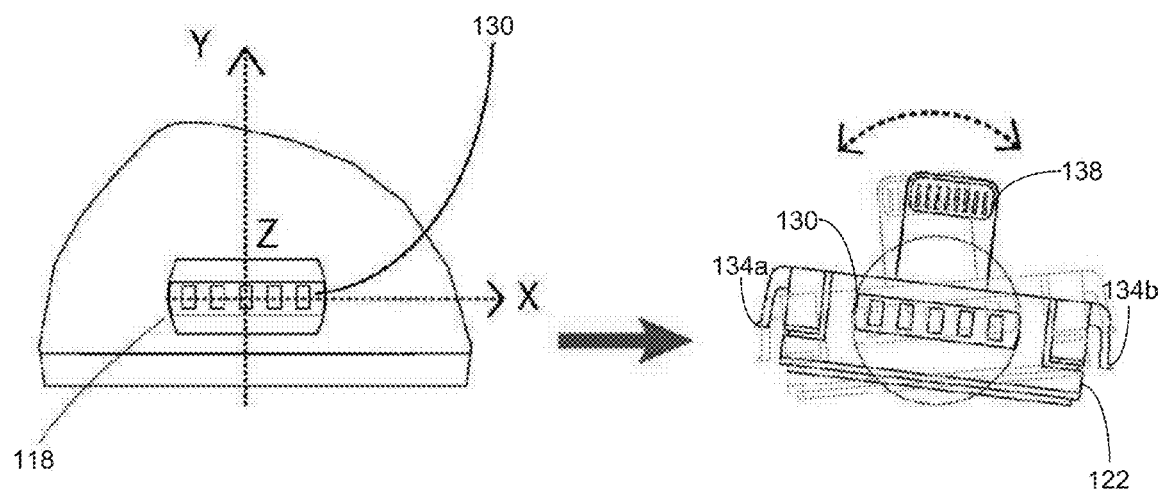
FIGS. 6A and 6B illustrate side views of the charging assembly in the charge chamber, where

As shown in FIG. 6A, in addition to performing the function of charging and aligning the communication device 200, the charging assembly 120 serves to provide shock absorption for the attached communication device 200 inside the casing 102. The first feature that enables shock absorption for the communication device 200 inside the casing 102 includes a pair of mounts 132a-b. The mounts 132a-b serve to detachably attach the charging assembly 120 inside the charge chamber 114 of the casing 102.

In some embodiments, the mounts 132a-b may include a pair of flexible tabs 134a-c configured to deform during an impact in order to provide energy attenuation for the communication device 200. The flexible tabs 134a-c also enable the charging assembly 120 to move laterally against multiple chamber sidewall 116s that make up the charge chamber 114 (FIG. 6B). In this manner, the communication device 200, which is connected to the charging assembly 120, may move laterally inside the casing 102. The material composition of the pair of flexible tabs 134a-c may include, without limitation, rubber, plastic, and metal.

Looking back at FIG. 3, the connector 138 of the charging assembly 120 transmits electricity and signals from outside the casing 102 to the cavity 110 of the casing 102. The connector 138 is defined by a charge reception end 140 and a charge transmission end 146. The electrical and signal transmission is carried from the charge reception end 140 to the charge transmission end 146. The charge transmission end 146 may be configured to mate with a port in the communication device 200. The charge transmission end 146 includes at least one member selected from the following: a USB, a mini USB, and a Micro USB. A printed circuit board assembly 142 and a cap 144 overlay the charge reception end 140. The printed circuit board assembly 142 may be ASIC controlled.

As illustrated in FIG. 7A, the second feature that enables shock absorption for the communication device 200 inside the casing 102 includes a plurality of springs 148. The springs 148 are positioned on the at least one chamber sidewall 116 of the charge chamber 114. In one embodiment, the springs 148 comprise six equidistant metal springs 148 that position on the chamber sidewall 116. Though, any number of springs 148, or configuration of tensioning members may be used. The charge chamber 114 is shaped to include a space between the charging assembly 120 and the chamber sidewall 116. The space enables the springs 148 to form a flexible, shock absorbing surface inside the chamber sidewalls 116, such that the charging assembly 120 has freedom to press against the chamber sidewalls 116.

As shown in FIG. 7B, the springs 148 are configured to absorb shocks that are applied to the casing 102 by flexing when the casing 102 is impacted, and thereby distribute the forces applied to the charging assembly 120 and the communication device 200 inside the casing 102. Thus, the springs 148 help the communication device 200 to float inside the casing 102, when attached to the charging assembly 120.

In general though, the flexible tabs 134a-c of the mounts 132a-b, the springs 148 on the chamber sidewall 116, and the flexible material, i.e., elastomer, work in conjunction to create a free floating effect for the charging assembly 120, and thereby the attached communication device 200 inside the casing 102. In this manner, the communication device 200 has enough movement and free play to float along the x, y, and z axes of the casing 102, while still maintaining stability (FIGS. 6B and 7B).

Additionally, the flexible tabs 134a-c springs 148, and flexible material 152 absorb a substantial portion of the impact forces, such that energy attenuation and uniform impact distribution on the charging assembly 120 results in shock absorption for the attached communication device 200. It is also significant to note that the magnetic strip 156 that may be embedded in the casing sidewall 106 imparts a small magnetic force on the communication device 200 that helps create the floating effect.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A case for providing multiple power sources and absorbing shock for a communication device, the case comprising:
   a casing, the casing defined by a panel, at least one casing sidewall, and a cavity, the panel formed at a back side of the casing, the at least one casing sidewall having an aperture;
   a hidden compartment, the hidden compartment formed at the panel of the casing, the hidden compartment operatively connected to the cavity of the casing;
   a charge chamber, the charge chamber formed at the at least one casing sidewall, the charge chamber defined by at least one chamber sidewall, and a slot that forms in the at least one chamber sidewall;
   a charging assembly, the charging assembly defined by a housing, a pair of mounts, and a connector, the charging assembly configured to be electrically conductive, the charging assembly disposed to pass through the aperture of the casing, the charge chamber, the slot of the charge chamber, and the cavity of the casing,
   the housing of the charging assembly defined by an interior end and an exterior end, the housing comprising an alignment bar arranged in a protruding configuration on the housing, the alignment bar configured to form a snug fit in the slot of the charge chamber, wherein the snug interaction restricts pivotal movement of the charging assembly in the charge chamber,
   the pair of mounts of the charging assembly configured to detachably attach the charging assembly inside the charge chamber, the pair of mounts having a pair of flexible tabs, the pair of flexible tabs configured to deform during an impact in order to create energy attenuation,
   the connector of the charging assembly defined by a charge reception end and a charge transmission end, the connector configured to carry electricity from outside the casing to the cavity of the casing;
   a plurality of springs, the plurality of springs disposed to position on the at least one chamber sidewall, the plurality of springs configured to absorb shocks that are applied to the casing by flexing when the casing is impacted, wherein the forces applied to the charge chamber and the casing are at least partially distributed; and
   a flexible material, the flexible material disposed to line the at least one chamber sidewall and the at least one casing sidewall, the flexible material configured to help absorb impact forces applied to the charging assembly.

2. The case of claim 1, wherein the phone case is configured to receive a communication device.

3. The case of claim 2, wherein the communication device is a smart phone.

4. The case of claim 1, wherein the casing is fabricated from a synthetic resin cases produced by injection-molding in a specific shape that conforms to the outline of the smart phone.

5. The case of claim 1, wherein the casing is configured to provide insulation from electricity.

6. The case of claim 1, wherein the casing is defined by an x, y, and z axes.

7. The case of claim 6, wherein the casing enables the communication device to move in the x, y, and z axes, so as to create a floating effect.

8. The case of claim 1, wherein the hidden compartment is sized and dimensioned to store a rechargeable battery.

9. The case of claim 8, wherein the rechargeable battery operatively connects to the communication device through a prong.

10. The case of claim 1, wherein the slot in the at least one chamber sidewall of the charge chamber is generally oval-shaped.

11. The case of claim 1, wherein the charging assembly forms a conductive junction between an A/C power cable and the communication device.

12. The case of claim 1, wherein the housing of the charging assembly forms a generally T-shape.

13. The case of claim 1, wherein the housing of the charging assembly is defined by an interior end proximal to the communication device, and an exterior end that extends from the aperture of the casing.

14. The case of claim 1, wherein the interior end of the housing comprises a pair of pins.

15. The case of claim 14, wherein the pair of mounts comprises a pair of pin holes, wherein the pair of pin holes receive the pair of pins for coupling the pair of mounts to the housing.

16. The case of claim 1, wherein the plurality of springs includes six springs positioned equidistant on three chamber sidewalls.

17. The case of claim 1, wherein the flexible material is an elastomer.

18. The case of claim 1, further including a magnetic strip, the magnetic strip disposed to line the at least one casing sidewall.

19. The case of claim 1, further including a glucose meter, the glucose meter disposed to extend from the hidden compartment.

20. A case for providing multiple power sources and absorbing shock for a communication device, the case comprising:
   a casing, the casing configured to form an electrical insulation, the casing defined by a panel, at least one casing sidewall, and a cavity, the panel formed at a back side of the casing, the at least one casing sidewall having an aperture;
   a hidden compartment, the hidden compartment formed at the panel of the casing, the hidden compartment operatively connected to the cavity of the casing, the hidden compartment comprising a door, the door configured to slidably regulate access to the hidden compartment;
   a charge chamber, the charge chamber formed at the at least one casing sidewall, the charge chamber defined by at least one chamber sidewall, and a slot that forms in the at least one chamber sidewall;
   a charging assembly, the charging assembly defined by a housing, a pair of mounts, and a connector, the charging assembly configured to be electrically conductive, the charging assembly further configured to convert an AC current to a DC current, the charging assembly disposed to pass through the aperture of the casing, the charge chamber, the slot of the charge chamber, and the cavity of the casing, the housing of the charging assembly defined by an interior end and an exterior end, the housing comprising an alignment bar arranged in a protruding configuration on the housing, the alignment bar configured to form a snug fit in the slot of the charge chamber, wherein the snug interaction restricts pivotal movement of the charging assembly in the charge chamber, the pair of mounts of the charging assembly configured to detachably attach the charging assembly inside the charge chamber, the pair of mounts having a pair of flexible tabs, the pair of flexible tabs configured to deform during an impact in order to create energy attenuation, the connector of the charging assembly defined by a charge reception end and a charge transmission end, the charge reception end comprising a printed circuit board assembly and a cap, the connector configured to carry electricity from outside the casing to the cavity of the casing;

a plurality of springs, the plurality of springs disposed to position on the at least one chamber sidewall, the plurality of springs configured to absorb shocks that are applied to the casing by flexing when the casing is impacted, wherein the forces applied to the charge chamber and the casing are at least partially distributed; and a flexible material, the flexible material disposed to line the at least one chamber sidewall and the at least one casing sidewall, the flexible material configured to help absorb impact forces applied to the charging assembly.

* * * * *